United States Patent
Pas

(10) Patent No.: US 10,430,855 B2
(45) Date of Patent: Oct. 1, 2019

(54) SYSTEM, AND METHODS FOR INTERACTION WITH A RETAIL ENVIRONMENT

(71) Applicant: Hussmann Corporation, Bridgeton, MO (US)

(72) Inventor: Ireneus Johannes Pas, Arnhem (NL)

(73) Assignee: Hussmann Corporation, Bridgeton, MO (US)

( * ) Notice: Subject to any disclaimer, the term of this patent is extended or adjusted under 35 U.S.C. 154(b) by 1030 days.

(21) Appl. No.: 14/301,264

(22) Filed: Jun. 10, 2014

(65) Prior Publication Data

US 2015/0356657 A1    Dec. 10, 2015

(51) Int. Cl.
| G06Q 30/00 | (2012.01) |
| G06Q 30/06 | (2012.01) |
| A47F 11/10 | (2006.01) |
| A47F 10/02 | (2006.01) |

(52) U.S. Cl.
CPC .......... *G06Q 30/0629* (2013.01); *A47F 11/10* (2013.01); *G06Q 30/0639* (2013.01); *A47F 2010/025* (2013.01)

(58) Field of Classification Search
CPC ............... G06Q 30/0629; G06Q 30/0639
USPC ..................................... 705/26.64
See application file for complete search history.

(56) References Cited

U.S. PATENT DOCUMENTS

| 2,360,362 A | 10/1944 | Orosz |
| 3,217,667 A | 11/1965 | Patterson |
| 3,294,249 A | 12/1966 | Simmons |
| 3,316,041 A | 4/1967 | Nelson |
| 3,838,266 A | 9/1974 | Jonathan et al. |

(Continued)

FOREIGN PATENT DOCUMENTS

| DE | 202004000004 | 6/2004 |
| DE | 102007006562 A1 | 8/2008 |

(Continued)

OTHER PUBLICATIONS

Design and Implementation of a Wireless Sensor Network for Intelligent Light Control (Year: 2007).*

(Continued)

*Primary Examiner* — Jeffrey A. Smith
*Assistant Examiner* — Lalith M Duraisamygurusamy
(74) *Attorney, Agent, or Firm* — Michael Best & Friedrich LLP

(57) ABSTRACT

A retail system configured to provide interaction between a user and product supported in a retail environment. The system includes a plurality of merchandisers, an access device, and a controller. Each merchandiser defines a product display area and has one or more light sources positioned to illuminate product. The access device has a processing system operable to select a light characteristic associated with the light sources in response to user input, and the access device is operable by a user to select a desired product. The access device is programmed to generate one or more signals indicative of the selected light characteristic and the desired product. In response to the one or more signals, the controller controls the light sources associated with the desired product to illuminate at least partially based on the light characteristic to identify a location of the desired product to the user.

37 Claims, 11 Drawing Sheets

(56) References Cited

U.S. PATENT DOCUMENTS

| | | | |
|---|---|---|---|
| 3,886,348 A | 5/1975 | Jonathan et al. |
| 4,225,808 A | 9/1980 | Saraceni |
| 4,318,876 A | 3/1982 | Broussaud |
| 4,355,309 A | 10/1982 | Hughey et al. |
| 4,445,147 A | 4/1984 | Kessman et al. |
| 4,507,714 A | 3/1985 | Aschinger et al. |
| 4,598,341 A | 7/1986 | Brackhahn et al. |
| 5,120,116 A | 6/1992 | Amstutz et al. |
| 5,205,638 A | 4/1993 | Squitieri |
| 5,530,322 A | 6/1996 | Ference et al. |
| 5,626,028 A | 5/1997 | Graat et al. |
| 5,879,070 A | 3/1999 | Severloh |
| 5,945,993 A | 8/1999 | Fleischmann |
| 6,016,038 A | 1/2000 | Mueller et al. |
| 6,150,774 A | 11/2000 | Mueller et al. |
| 6,166,496 A | 12/2000 | Lys et al. |
| 6,174,073 B1 | 1/2001 | Regan et al. |
| 6,278,887 B1 | 8/2001 | Son et al. |
| 6,325,523 B1 | 12/2001 | Santosuosso et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,655,817 B2 | 12/2003 | Devlin et al. |
| 6,777,891 B2 | 8/2004 | Lys et al. |
| 6,801,003 B2 | 10/2004 | Schanberger et al. |
| 6,822,551 B2 | 11/2004 | Li et al. |
| 6,868,295 B2 | 3/2005 | Huang |
| 6,896,145 B2 | 5/2005 | Higgins et al. |
| 6,930,455 B2 | 8/2005 | Chansky et al. |
| 6,933,685 B2 | 8/2005 | Gutta et al. |
| 7,014,336 B1 | 3/2006 | Ducharme et al. |
| 7,038,398 B1 | 5/2006 | Lys et al. |
| 7,114,829 B2 | 10/2006 | Lai |
| 7,152,040 B1 | 12/2006 | Hawthorne et al. |
| 7,167,777 B2 | 1/2007 | Budike, Jr. |
| 7,391,337 B2 | 6/2008 | St-Germain |
| 7,453,217 B2 | 11/2008 | Lys et al. |
| 7,502,034 B2 | 3/2009 | Chemel et al. |
| 7,572,028 B2 | 8/2009 | Mueller et al. |
| 7,574,363 B2 | 8/2009 | Bodin |
| 7,665,860 B2 | 2/2010 | Demarest et al. |
| 7,729,941 B2 | 6/2010 | Zampini, II et al. |
| 7,761,186 B2 | 7/2010 | Keller et al. |
| 7,796,034 B2 | 9/2010 | Laski et al. |
| 7,900,735 B2 | 3/2011 | Iwaki et al. |
| 7,950,817 B2 | 5/2011 | Zulim et al. |
| 7,954,979 B2 | 6/2011 | Sommers et al. |
| 7,959,320 B2 | 6/2011 | Mueller et al. |
| 7,973,498 B2 | 7/2011 | Kawashima et al. |
| 7,990,080 B2 | 8/2011 | Chang et al. |
| 8,049,437 B2 | 11/2011 | Chang et al. |
| 8,057,054 B2 | 11/2011 | Hudis |
| 8,082,061 B2 | 12/2011 | Segal et al. |
| 8,086,490 B2 | 12/2011 | Zampini, II et al. |
| 8,113,678 B2 | 2/2012 | Babcock et al. |
| 8,164,274 B2 | 4/2012 | Pas |
| 8,189,855 B2 | 5/2012 | Opalach et al. |
| 8,214,061 B2 | 7/2012 | Westrick, Jr. et al. |
| 8,223,017 B2 | 7/2012 | Oketani et al. |
| 8,235,539 B2 | 8/2012 | Thomas et al. |
| 8,248,214 B2 | 8/2012 | Moseley |
| 8,271,881 B2 | 9/2012 | Moorer et al. |
| 8,272,755 B2 | 9/2012 | Oketani et al. |
| 8,314,569 B2 | 11/2012 | Adamson et al. |
| 8,322,873 B2 | 12/2012 | Glovatsky et al. |
| 8,339,247 B2 | 12/2012 | Adamson et al. |
| 8,395,524 B2 | 3/2013 | Sunderland et al. |
| 8,463,430 B2 | 6/2013 | Segal et al. |
| 8,504,183 B2 | 8/2013 | McKinley et al. |
| 8,567,982 B2 | 10/2013 | Zampini, II et al. |
| 8,577,136 B1 | 11/2013 | Ascher et al. |
| 8,604,908 B1 | 12/2013 | Kuniavsky et al. |
| 8,659,237 B2 | 2/2014 | Archenhold |
| 8,683,745 B2 | 4/2014 | Artwohl et al. |
| 8,684,268 B2 | 4/2014 | Pas |
| 2001/0049636 A1 | 12/2001 | Hudda et al. |
| 2001/0051901 A1 | 12/2001 | Hager et al. |
| 2002/0109980 A1 | 8/2002 | Santosuosso et al. |
| 2003/0015945 A1 | 1/2003 | Vandenbussche |
| 2003/0036985 A1 | 2/2003 | Soderholm |
| 2003/0069811 A1 | 4/2003 | Ximenes et al. |
| 2003/0072117 A1 | 4/2003 | Mackawa et al. |
| 2003/0072147 A1 | 4/2003 | Pashley et al. |
| 2003/0133292 A1 | 7/2003 | Mueller et al. |
| 2004/0088229 A1 | 5/2004 | Xu |
| 2004/0222306 A1 | 11/2004 | Fajarillo |
| 2005/0097162 A1 | 5/2005 | Budike, Jr. |
| 2005/0151489 A1 | 7/2005 | Lys et al. |
| 2005/0258961 A1 | 11/2005 | Kimball et al. |
| 2005/0265019 A1 | 12/2005 | Sommers et al. |
| 2005/0275626 A1 | 12/2005 | Mueller et al. |
| 2006/0028822 A1 | 2/2006 | Tanamachi et al. |
| 2007/0108283 A1 | 5/2007 | Thuries |
| 2007/0171647 A1 | 7/2007 | Artwohl et al. |
| 2007/0273307 A1 | 11/2007 | Westrick et al. |
| 2008/0052243 A1 | 2/2008 | Narayanaswami et al. |
| 2008/0136356 A1* | 6/2008 | Zampini ............ G06Q 30/0241 315/308 |
| 2008/0151535 A1 | 6/2008 | de Castris |
| 2008/0315772 A1* | 12/2008 | Knibbe ................ G01S 13/825 315/149 |
| 2009/0012704 A1 | 1/2009 | Franco et al. |
| 2009/0063307 A1 | 3/2009 | Groenovelt et al. |
| 2009/0077841 A1 | 3/2009 | Ngo et al. |
| 2009/0240735 A1 | 9/2009 | Grandhi et al. |
| 2009/0278787 A1 | 11/2009 | Ott et al. |
| 2009/0296385 A1* | 12/2009 | Demarest ................ A47F 3/001 362/234 |
| 2010/0001660 A1 | 1/2010 | Pas |
| 2010/0049635 A1 | 2/2010 | Delaney et al. |
| 2010/0070388 A1 | 3/2010 | Spindler et al. |
| 2010/0076579 A1* | 3/2010 | Naeh ................ G06F 1/181 700/94 |
| 2010/0103131 A1 | 4/2010 | Segal et al. |
| 2010/0117496 A1 | 5/2010 | Clarke et al. |
| 2010/0205533 A1 | 8/2010 | Nykamp |
| 2010/0214948 A1 | 8/2010 | Knibbe et al. |
| 2010/0262296 A1 | 10/2010 | Davis et al. |
| 2010/0280918 A1 | 11/2010 | Balent |
| 2011/0010019 A1 | 1/2011 | Shloush et al. |
| 2011/0273114 A1 | 11/2011 | Ogg et al. |
| 2011/0289184 A1 | 11/2011 | Wolinsky et al. |
| 2011/0298379 A1 | 12/2011 | Jung et al. |
| 2012/0038286 A1 | 2/2012 | Hasnain |
| 2012/0084126 A1 | 4/2012 | Zampini, II et al. |
| 2012/0112668 A1 | 5/2012 | Van de Sluis et al. |
| 2012/0233003 A1 | 9/2012 | Calman et al. |
| 2012/0242254 A1 | 9/2012 | Kim et al. |
| 2012/0286928 A1* | 11/2012 | Mullen ................ G06Q 10/00 340/5.61 |
| 2012/0308086 A1 | 12/2012 | Atsmon et al. |
| 2012/0330757 A1 | 12/2012 | Heidenreich et al. |
| 2013/0107042 A1 | 5/2013 | Forster |
| 2013/0155672 A1 | 6/2013 | Vo et al. |
| 2013/0218721 A1 | 8/2013 | Borhan et al. |
| 2013/0271696 A1 | 10/2013 | Dunn |
| 2013/0290106 A1 | 10/2013 | Bradley et al. |
| 2013/0293141 A1 | 11/2013 | Pas |
| 2013/0308254 A1 | 11/2013 | Checchi et al. |
| 2013/0317916 A1 | 11/2013 | Gopalakrishnan et al. |
| 2013/0335353 A1 | 12/2013 | Segal et al. |
| 2014/0003727 A1 | 1/2014 | Lortz et al. |
| 2014/0006229 A1 | 1/2014 | Birch et al. |
| 2014/0057646 A1* | 2/2014 | Vaananen ............ G08B 13/2462 455/456.1 |
| 2014/0067570 A1* | 3/2014 | Sengupta ................ G06Q 30/06 705/21 |
| 2014/0129354 A1 | 5/2014 | Soon-Shiong |
| 2014/0144083 A1 | 5/2014 | Artwohl et al. |
| 2014/0334653 A1* | 11/2014 | Luna ................ G05B 15/02 381/332 |

(56) References Cited

U.S. PATENT DOCUMENTS

| | | | |
|---|---|---|---|
| 2015/0227890 A1* | 8/2015 | Bednarek | G06Q 10/08355 705/26.81 |
| 2015/0228004 A1* | 8/2015 | Bednarek | G06Q 30/0633 705/26.8 |
| 2015/0278897 A1* | 10/2015 | Nichols | G06Q 30/0639 705/26.41 |
| 2015/0310539 A1* | 10/2015 | McCoy | G06Q 30/0641 705/27.1 |
| 2015/0349883 A1* | 12/2015 | Mitchell | H04B 10/116 398/118 |

FOREIGN PATENT DOCUMENTS

| | | |
|---|---|---|
| DE | 102013104365 A1 | 10/2013 |
| EP | 1183964 | 2/2007 |
| JP | 2006259813 | 9/2006 |
| JP | 2008077131 | 4/2008 |
| JP | 2010009566 | 1/2010 |
| KR | 20120001285 A | 1/2012 |
| KR | 1020120075571 | 7/2012 |
| WO | WO 2007/016515 | 2/2007 |
| WO | WO 2008/026913 | 3/2008 |
| WO | 2015/149019 | 10/2015 |

OTHER PUBLICATIONS

First Office Action from the New Zealand Intellectual Property Office for Application No. 727174 dated Jun. 15, 2017 (5 pages).
First Office Action from the Australian Intellectual Property Office for Application No. 2015275191 dated Jul. 7, 2017 (3 pages).
International Search Report for Application No. PCT/US2015/030150 dated Jul. 29, 2015 (3 pages).
International Written Opinion for Application No. PCT/US2015/030150 dated Jul. 29, 2015 (12 pages).
Extended European Search Report for Application No. 15805913.9 dated Oct. 26, 2017 (8 pages).
EP15805744.8 Extended European Search Report dated Oct. 4, 2017 (8 pages).
European Patent Office Examination Report for Application No. 15805744.8 dated Apr. 2, 2019 (9 pages).
Epicenterbryan, "iPhone Control of RGB lights with RFduino—Arduino BLE bluetooth 4", <https://www.youtube.com/watch?v=efFLB10jneY> published Dec. 16, 2013.
geek.com, "Best Hue apps for Android", <https://www.youtube.com/watch?v=dGX-Fao6hq4> published Jan. 16, 2014.

* cited by examiner

SYSTEM, AND METHODS FOR INTERACTION WITH A RETAIL ENVIRONMENT

BACKGROUND

The present invention relates to merchandisers, and more particularly, to lighting control for merchandisers.

Existing merchandisers include light assemblies that illuminate the product display areas. Some merchandisers are connected to a controller that is in communication with a database pre-programmed with light control settings based on the type of product supported in the product display area. Typically, the light control settings in existing merchandisers are adjusted when product is scanned in or near the merchandiser, and then placed in the product display area. Each product has an identifier that is recognized by the controller, which in turn determines the light control settings for the product display area.

SUMMARY

One problem with existing merchandiser systems is that a consumer or personnel working in the retail setting cannot easily locate product in the product display area (e.g., for purchase or stocking) or determine whether desired product is available. In addition, while shopping list and inventory tools exist, it can be difficult to determine whether the item sought matches exactly with the product that is desired.

The present invention provides a retail system that provides interaction between a user and product supported in a retail environment. The retail system includes a plurality of merchandisers each defining a product display area in which product is supported, and each having one or more light sources positioned to illuminate the product. The system also includes an access device and a controller that is in communication with the light sources and the access device. The access device has a processing system that is operable to select a light characteristic associated with the light sources in response to user input, and the access device is operable by a user to select a desired product. The access device is programmed to generate one or more signals indicative of the selected light characteristic and the desired product. In response to the one or more signals indicative of the selected light characteristic and the desired product, the controller is programmed to control at least one of the light sources associated with the desired product to illuminate at least partially based on the light characteristic to identify a location of the desired product to the user.

The present invention also provides a method of interaction between a user and product supported in a retail environment that has one or more merchandisers defining respective product display areas in which product is supported and that has one or more light sources positioned to illuminate the product. The method includes transmitting a signal indicative of the desired product to the merchandiser supporting the desired product in response to selection of the desired product via an access device, altering a light characteristic of at least one light source associated with the desired product in response to the signal, and identifying a location of the desired product to a user via illumination after altering the light characteristic.

The present invention also provides a method of interaction between a user and product supported in a retail environment that has one or more merchandisers defining respective product display areas in which product is supported and that has one or more light sources positioned to illuminate the product. The method includes selecting a light characteristic associated with light sources in the merchandisers and identifiable to a user, and transmitting one or more signals indicative of the selected light characteristic and a desired product to the merchandiser supporting the desired product in response to selection of the desired product via an access device. The method also includes modifying light output of at least one of the light sources from a first light characteristic to the selected light characteristic at least partially in response to the one or more signals, identifying a location of the desired product to the user via illumination based on the selected light characteristic, and identifying a location of product complementary to the desired product in response to the signals to the merchandiser.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
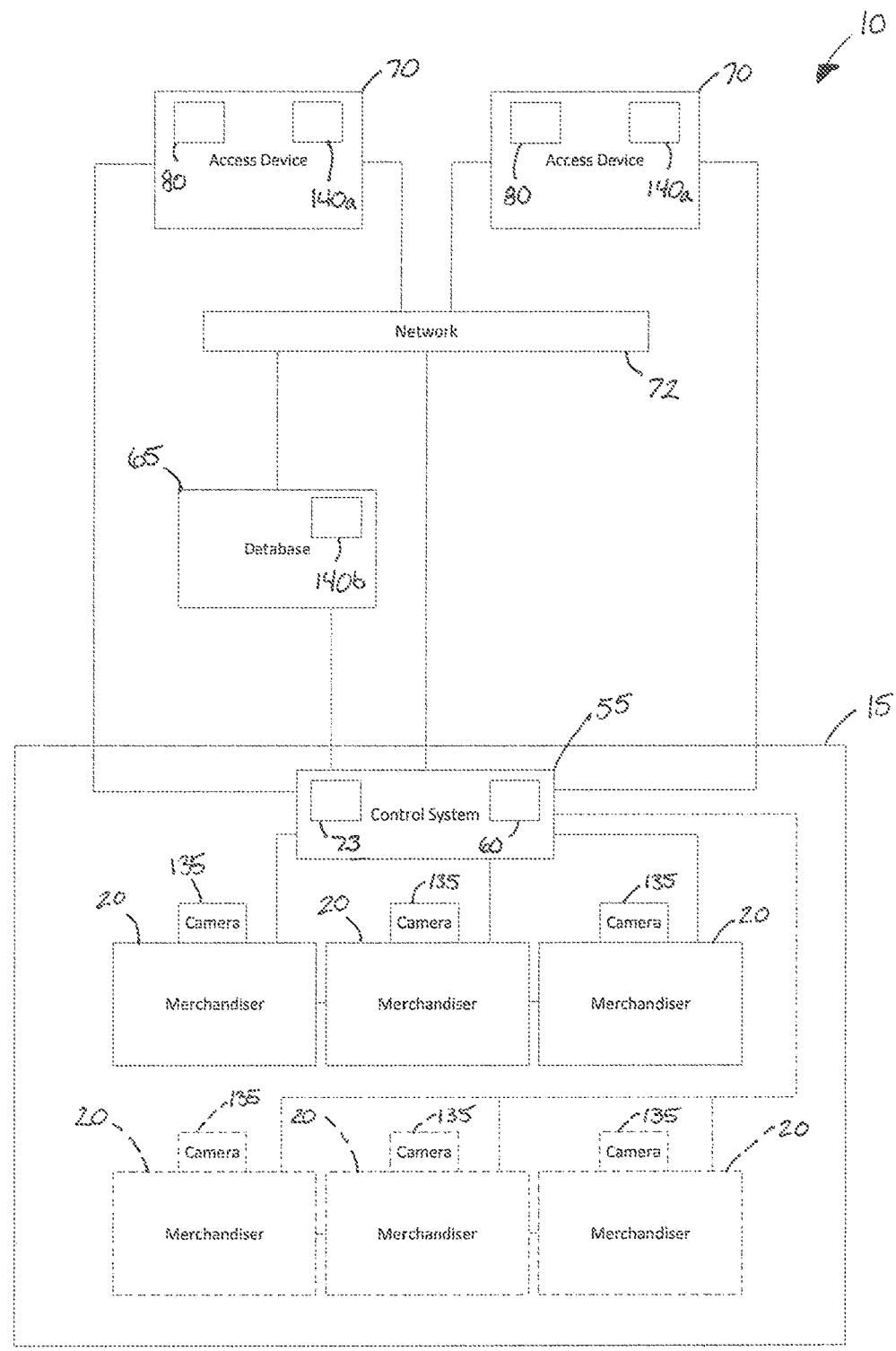
FIG. 1 is a schematic diagram illustrating a system embodying the present invention and including a retail store system having a plurality of merchandisers, a database, and an access device to control light in the merchandisers.

FIG. 1 illustrates an exemplary retail system 10 including a retail environment 15 that may be located in a supermarket or a convenience store or other retail setting (not shown) for presenting fresh food, beverages, and other product 35 to consumers. The retail environment 15 includes a plurality of merchandisers 20 that can be arranged within the retail setting (e.g., in aisles, islands, etc.). The merchandisers 20 shown in dashed lines in FIG. 1 are intended to illustrate that the quantity of merchandisers 20 in the retail environment 15 can vary depending on the size of the retail environment 15 and other factors.

Referring to FIGS. 1-6, each merchandiser 20 includes a case 25 that defines a product display area 30 in which product 35 can be supported (e.g., on shelves 40) and accessed from adjacent a front of the case 25. As illustrated in FIGS. 2-5, doors 45 can be attached to the case 25 to enclose the product display area 30. While the merchandisers 20 are illustrated as upright merchandisers 20, one or more of the merchandisers 20 can include other types of merchandisers 20 (e.g., horizontal merchandisers 20). Also, the merchandisers 20 can be non-refrigerated merchandisers 20 (e.g., for non-perishable product), heated merchandisers 20, or refrigerated merchandisers 20 that include at least a portion of a refrigeration system (not shown) to provide refrigerated airflow to the product display area 30.

Figure 6:
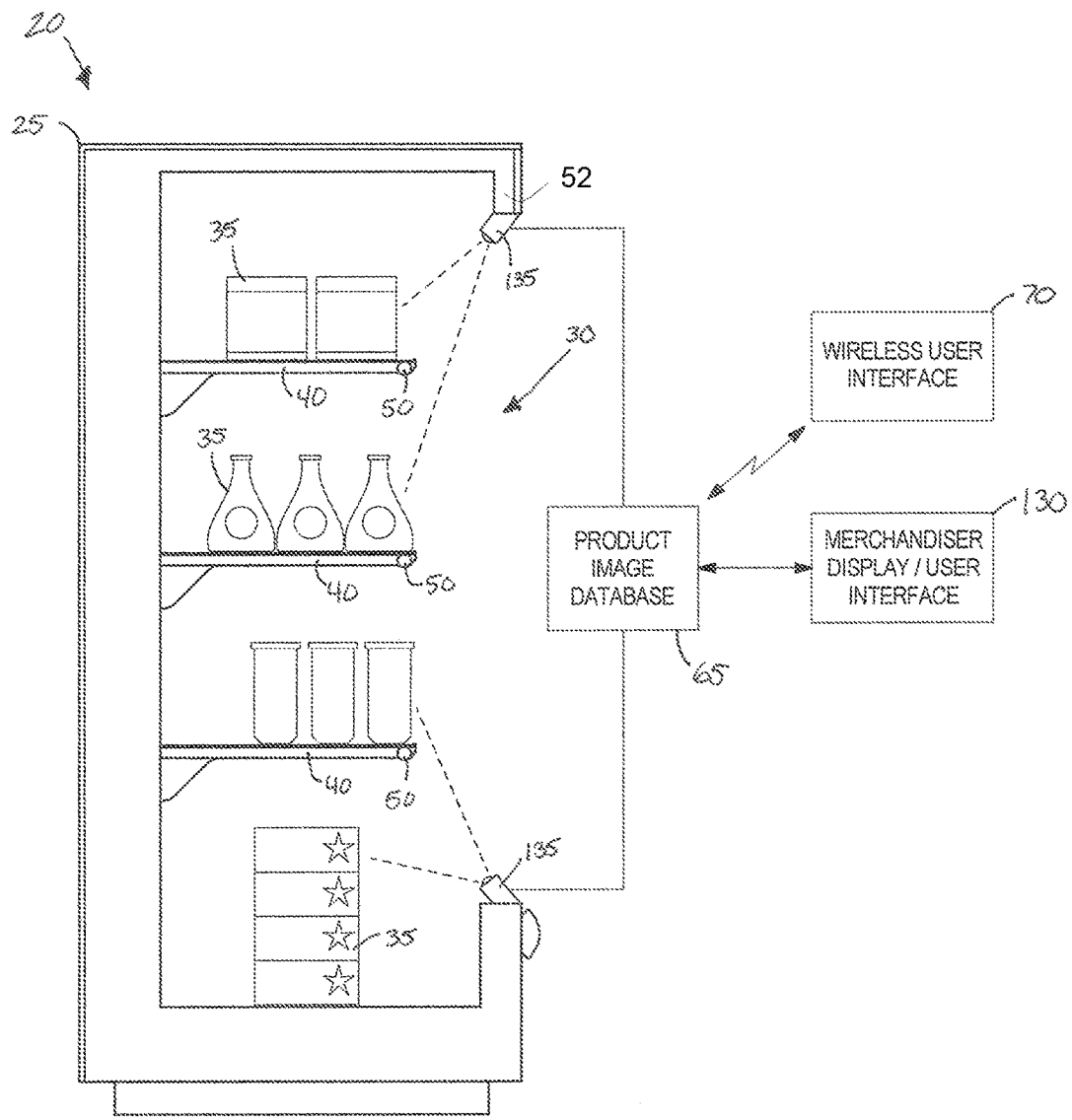
FIG. 6 is a view illustrating an exemplary inventory management system of product supported in one or more merchandisers.

FIG. 6 illustrates that each merchandiser 20 includes a plurality of light sources 50 (e.g., luminaires including light emitting diodes or "LEDs") that are coupled to the case 25 (e.g., the shelves 40) to illuminate the product 35 within the product display area 30. As illustrated, the light sources 50 are coupled to a canopy 52 and to cantilevered ends of the shelves 40. The illustrated locations of the light sources 50 are only exemplary. The light sources 50 can be coupled to the merchandiser 20 in any location within the case 25 to illuminate the product display area 30. In addition, the light sources 50 can be the primary sources of illumination for the product 35, or accent or secondary light sources 50 that supplement other primary sources of light. Generally, light output from the light sources 50 is defined by light characteristics (e.g., hue, color, color temperature, intensity, motion, etc.) that affect how product 35 is illuminated in the product display area 30. As described in detail below, these light characteristics can be adjusted or modified to identify a location of desired product 35d.

Referring to FIGS. 1-5, the merchandisers 20 can be positioned adjacent one another and are each in communication with a control system 55. The control system 55 is connected to each merchandiser 20 and the light sources 50 and can include a global or master controller 60 and one or more slave controllers disposed in each merchandiser 20 (or associated with a group or sub-set of merchandisers 20). As shown in FIG. 1, the retail system 10 also includes a database 65 (e.g., local or cloud-based) and access devices 70, and the control system 55 is in communication with the database 65 and the access devices 70. The exemplary system illustrated in FIG. 1 shows that the control system 55 is in direct communication with the database 65, and that the control system 55 can be in direct communication (e.g., a short range connection such as BLUETOOTH, ANT+, NFC, ZIGBEE, Z-WAVE, etc.) with the access devices 70, or communicatively connected to the access devices 70 over a network 72 (e.g., LAN, WAN, Internet, cellular, wired or wireless or a combination of both, etc.). It should be appreciated that each of the database 65 and the access devices 70 can be in direct communication with the control system 55 or in network communication with the control system 55 depending on design criteria and other factors. The control system 55 includes one or more microprocessors 73 that execute and process controls of the controller 60 and other components of the system 55. Information associated with control and operation of the merchandisers 20 can be stored in the database 65 or in another non-transitory memory or database of the control system 55.

The access devices 70 can be any suitable stationary or portable device (e.g., a computer, a laptop, a tablet, a smartphone, etc.) that includes an interactive graphical user interface 75 (e.g., a computer mouse or stylus, a touch screen, etc.). The access device 70 can take the form of a user or consumer access device 70 or a retail access device 70. As described in detail below, the consumer access device 70 can be used by a consumer or other user to search for and determine the location of one or more desired products 35, generate a shopping list, or check inventory in the retail environment 15. The retail access device 70 can be used by personnel associated with the retail setting to plan a layout for product 35 in one or more merchandisers 20, stock the product display areas 30 of one or more merchandisers 20, or check inventory of the product display areas 30.

Figure 7:
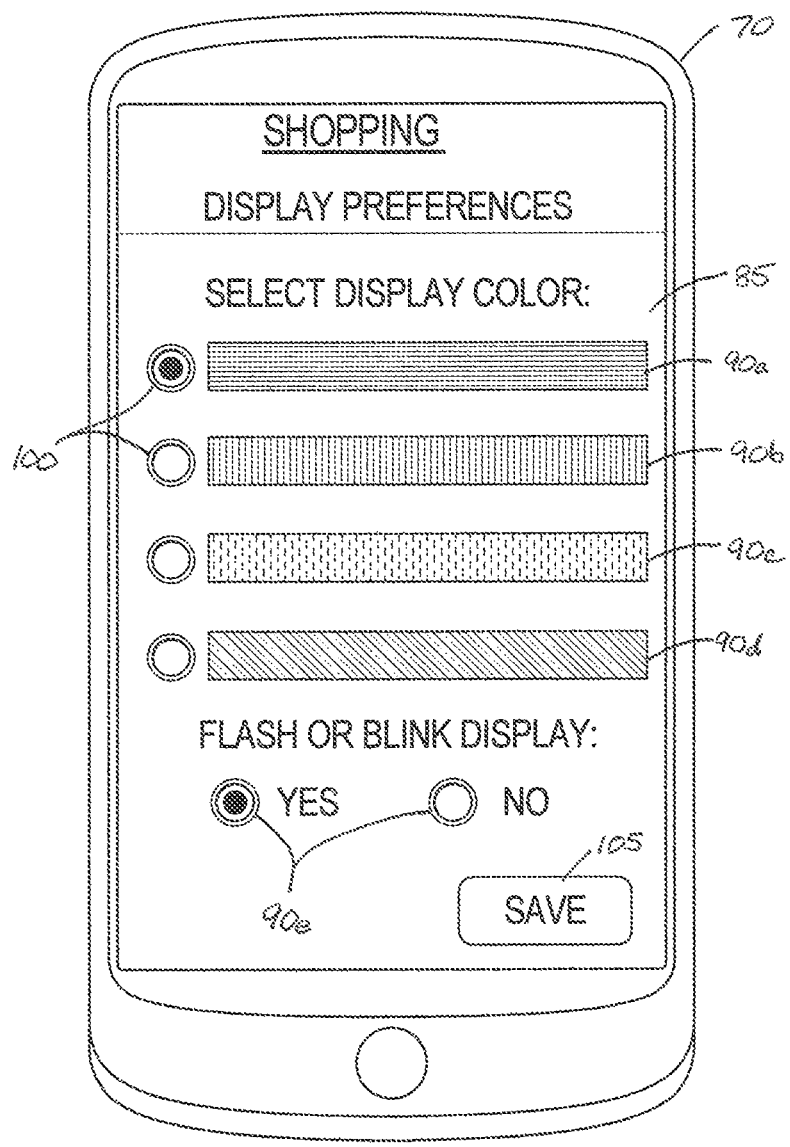
FIG. 7 is a view of the exemplary access device of FIGS. 2-4, illustrating a graphical representation for selection of a light characteristic personalized to the user.

For example, the access device 70 can be programmed to communicate a user-identifiable signal from the access device 70 directly or over the network 72 to the retail environment 15 to locate a desired product 35d by at least partially altering or modifying the light characteristic of the light source that is associated with the desired product 35d. Referring to FIGS. 1 and 7, the access device 70 includes a microprocessor 80 that selects a light characteristic associated with the light sources 50 in the retail system 10 in response to user input into the access device 70. The selected light characteristic is defined by and personal to the user based on the light characteristics that are available via the light sources 50. That is, the selected light characteristic is assigned to the consumer as their own personal identifying light characteristic when they go to the retail environment 15 to shop for product 35.

As shown in FIG. 7, the access device 70 can be programmed to display a first graphical representation 85 of the predetermined parameters associated with the light sources 50 for selection by the consumer. The illustrated graphical representation 85 depicts different selectable light characteristics 90 that the consumer can assign as their own personal identifying light characteristic when shopping in the retail setting. More specifically, the graphical representation 85 depicts (from top to bottom in FIG. 7) a blue color light characteristic 90a, a red color light characteristic 90b, a purple color light characteristic 90c, a green color light characteristic 90d, and options 90e, 90f to make at least a portion of a light source flash or blink or remain solid (in addition to or in lieu of changing color) to identify the location of desired product 35d. Other light characteristic options can be made available depending on the limitations of the light sources 50 (e.g., one or any combination of other colors, a pulse, a repeated rhythm, or indicia configured to identify the desired product 35d in the merchandiser 20). The available light characteristics 90 or predetermined parameters of the light sources 50 can be stored in the database 65 or in another location, and accessed by the access device 70. The selected light characteristic can include characteristics of the light sources 50 that provide the primary illumination for the product 35, or a secondary light source separate from the primary light source 50. U.S. Pat. No. 8,164,274, commonly assigned at the time of filing of this application and incorporated herein in its entirety by reference, describes exemplary primary light sources 50 that can be controlled to illuminate based on a selected light characteristic.

Figure 10:
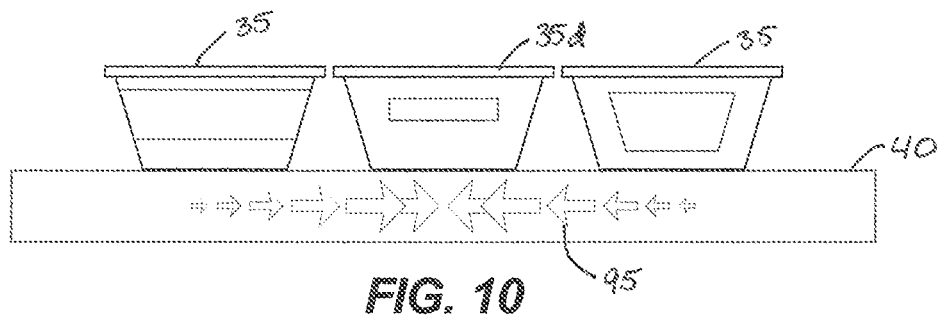
FIG. 10 is a view of an exemplary light characteristic for the system of FIG. 1.
Figure 11:
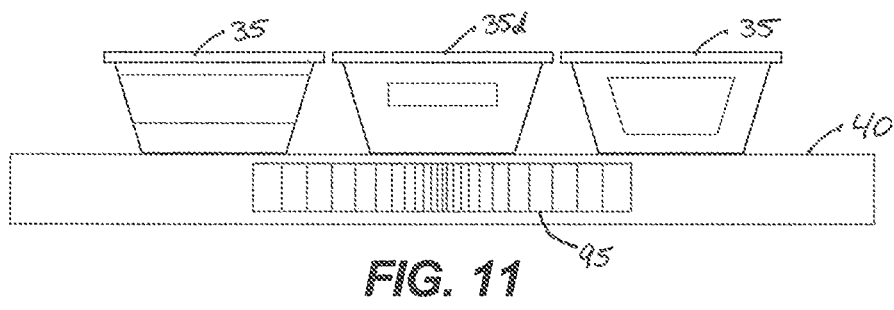
FIG. 11 is a view of another exemplary light characteristic.
Figure 12:
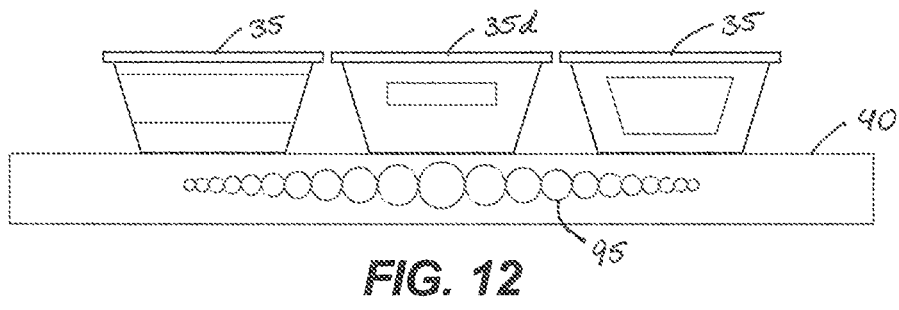
FIG. 12 is a view of another exemplary light characteristic.

FIGS. 10-12 illustrate illuminated indicia 95 that can be associated with the product 35 and that can be programmed to direct a person's attention to the product 35 when activated. In these examples, other light sources 50 form the primary source of illumination for the product 35. The indicia 95 can take the form of secondary light sources (e.g., accent lighting, supplemental lighting, etc.), or another type of indicia or display that draws attention to product in the product display area 30. For example, commonly assigned U.S. patent application Ser. No. 13/874,781, which is incorporated herein by reference its entirety, describes an exemplary system including electronic shelf labels located proximate a product display area 30. The indicia 95 can include the electronic shelf labels or another type of electronic display (e.g., an LED display) that can illuminate or otherwise draw a consumer's attention to a location in the product display area 30. The selected light characteristic can include illuminating or otherwise sending a signal to the indicia 95 on the ends of the shelves 40 so that the consumer (user) can recognize the indicia 95 when they are in the retail environment 15, as described in detail below.

FIG. 10 illustrates one example of the indicia 95 that can be coupled to an end of the shelf 40 in the form of an illuminated board or electronic display (e.g., electronic shelf labels). More specifically, the indicia 95 of FIG. 10 takes the form of a set of arrows that draws the attention of a person to the central product 35 on the shelf 40 (e.g., by constant illumination of the arrows (with a higher brightness level in the center, for example), or by sequential or repeatable illumination of the arrows toward the center, etc.).

FIG. 11 illustrates another example of the indicia 95 as a set of rectangular boxes that draws the attention of a person to the central product 35 on the shelf 40 (e.g., by constant illumination of the rectangles with a higher brightness level in the center, or by sequential or repeatable illumination of the boxes toward the center). FIG. 12 illustrates yet another example of the indicia in the form of a set of circles that draws the attention of a person to the central product 35 on the shelf 40 (e.g., by constant illumination of the circles with a higher brightness level in the center, or by sequential or repeatable illumination of the circles toward the center).

Referring back to FIG. 7, the desired light characteristic can be selected via a radio button 100 or some other selectable feature. As shown, the selected light characteristic is a flashing or blinking blue color light characteristic. The selected light characteristic can be saved to the consumer's profile or account via the "Save" button 105 so that the consumer does not need to establish the personalized light characteristic each time a product 35 is sought. It will be appreciated that the graphical representation illustrated in FIG. 7 is only exemplary and that the graphical representation can take other forms.

Figure 8:
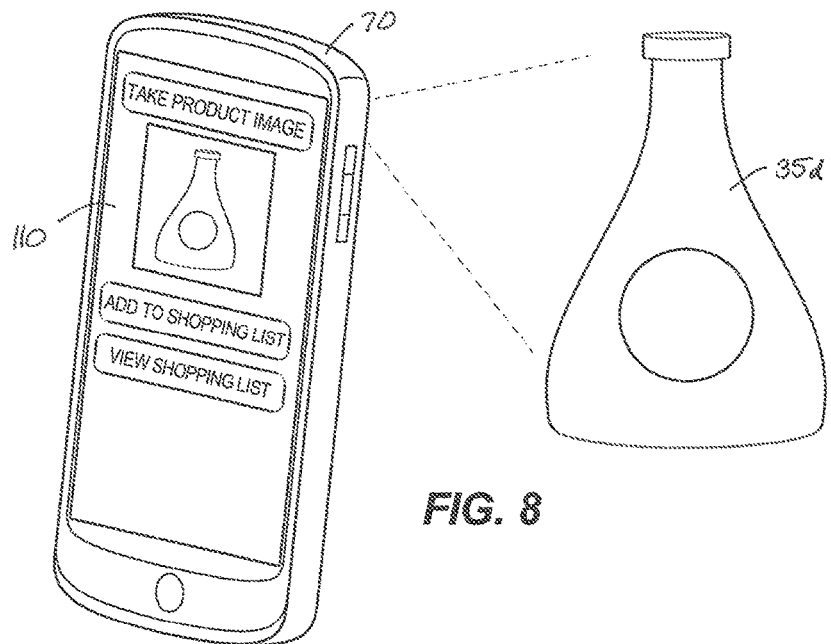
FIG. 8 is a view of the access device taking a picture of a product.
Figure 9:
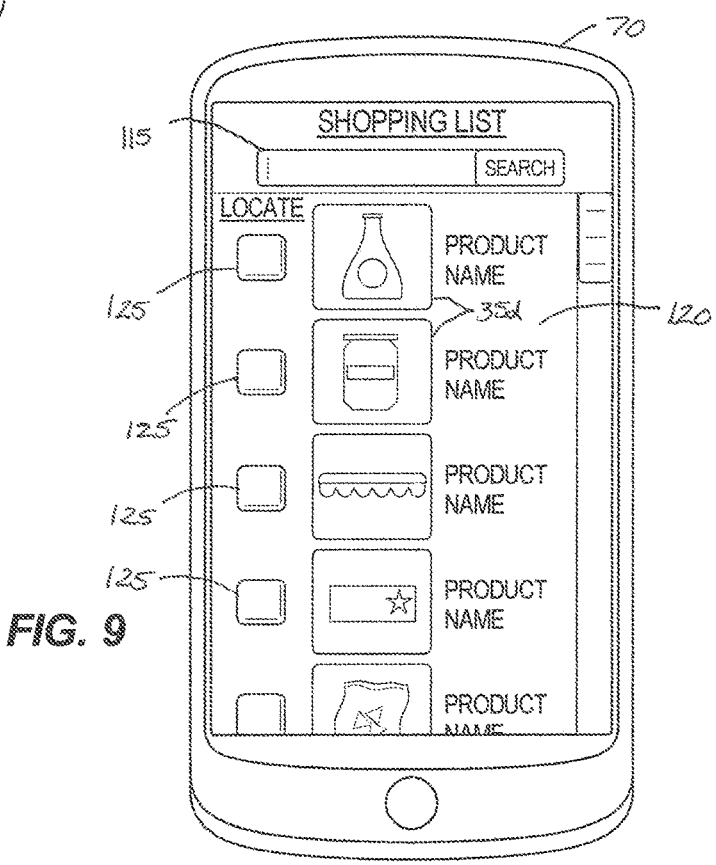
FIG. 9 is a view of the exemplary access device of FIGS. 2-4, illustrating a graphical representation of a shopping list and portions of the system of FIG. 1.

FIGS. 8 and 9 show that a consumer can search for product 35 in the retail environment 15 by taking a picture of a desired product 35d using the access device 70, searching for a product 35 via the access device 70, based on a shopping list stored on the access device 70, or any combination of these search tools. FIG. 8 illustrates that the access device 70 is programmed to display a second graphical representation 110 to allow a consumer to take a picture of a desired product 35d to add the desired product 35d to a shopping list.

FIG. 9 illustrates that the access device 70 is programmed to display a third graphical presentation of a shopping list that can be generated by taking a picture of product 35 (as described and illustrated with regard to FIG. 8), or by searching for product by name or product characteristics.

With reference to FIG. 9, the access device 70 has a search bar 115 that permits a consumer to search for a desired product 35d from among product 35 supported by the retail environment 15 and stored in the database 65. The shopping list can be generated by searching for product 35, by taking a picture of product 35, or downloading the shopping list from another source. After one or more desired products 35 have been identified by the consumer, a "locate" button can be selected to determine the location of the selected desired product 35d within the retail environment 15.

To locate desired product 35d, the access device 70 is programmed to generate one or more signals indicative of the selected light characteristic and indicative of the desired product 35d to be located. For example, the microprocessor 80 can generate a first signal indicative of the selected light characteristic, and a separate, second signal indicative of the desired product 35d selected by the consumer (e.g., by searching or via the shopping list). The first and second signals can be routed through the retail system 10 (either directly to the merchandiser 20 or via the network 72) as a combined signal, or separate signals. In another example, the microprocessor 80 can generate one signal indicative of the selected light characteristic and indicative of the desired product 35d selected by the consumer. The combined signal, the separate signals, or the single signal can be communicated to the merchandiser 20 and interpreted by the control system 55 to alter or change the light characteristic of at least a portion of the light source associated with the desired product 35d based on the selected light characteristic.

It is preferred that the one or more signals be transmitted to the control system 55 when the access device 70 is positioned within a predetermined range of the merchandiser 20 supporting the desired product 35d to avoid altering one or more light sources 50 when the consumer is not in a position to identify the location of the desired product 35d. For example, the retail system 10 can transmit the signals (e.g., deliver the signals) to the control system 55 only after the consumer has entered the retail environment 15. The presence of the consumer can be established by a connection to the local network or the retail environment 15, detection of a position of the consumer (e.g., via GPS), or in some other way. In another example, the retail system 10 can transmit the signals to the merchandiser 20 supporting the desired product 35d after the consumer has moved within a predetermined range (e.g., distance or proximity) of the merchandiser 20, such as within 30 feet of the merchandiser 20, or in the same aisle as the merchandiser 20 supporting the desired product 35d. The presence of the consumer adjacent or in proximity to the merchandiser 20 can be established by a local connection to the merchandiser 20 (e.g., via Bluetooth or another short range communication link), or by other components of the control system 55 or the retail system 10 (e.g., a camera).

In addition, the one or more signals can be transmitted to the control system 55 and the merchandiser 20 associated with the desired product 35d either manually or autonomously. With manual transmission of the signals, the access device 70 is programmed to transmit the one or more signals indicative of the selected light characteristic and the desired product 35d to the controller 60 in response to manual activation of the locate button 125 when the access device 70 is positioned within the predetermined range of the merchandiser 20 supporting the desired product 35d. With autonomous transmission of the signals, the access device 70 is programmed to transmit the one or more signals indicative of the selected light characteristic and the desired product 35d to the controller 60 in response to the access device 70 being positioned within a predetermined range of the merchandiser 20 supporting the desired product 35*d*. With autonomous transmission, there is no need for the consumer to manually activate the signals (e.g., via the locate button 125).

Figure 2:
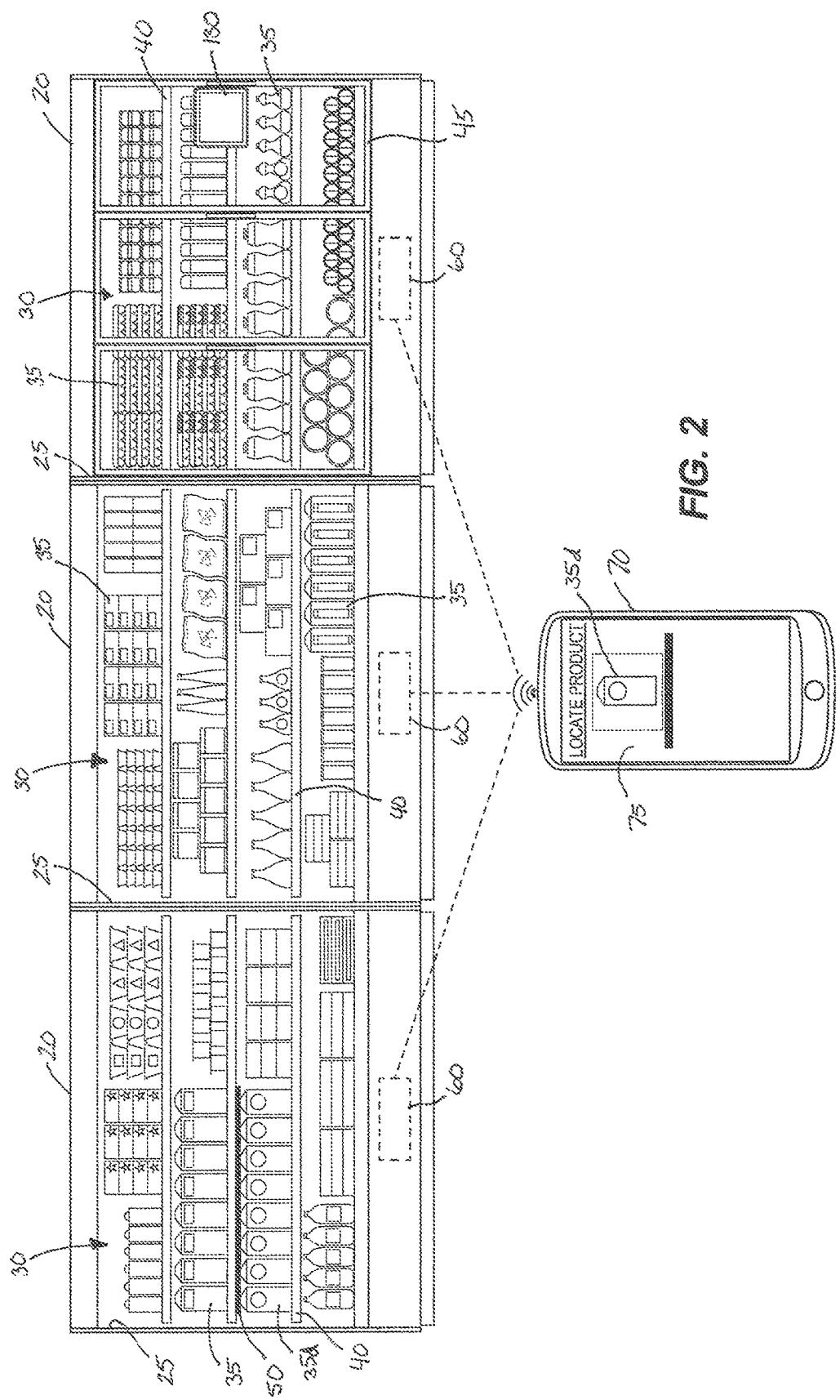
FIG. 2 is a view illustrating several merchandisers in direct communication with an exemplary access device of the system of FIG. 1.

FIG. 2 illustrates an exemplary lineup of merchandisers 20 three merchandisers 20 that define respective product display areas 30 and that are in direct communication with an access device 70. In this example, different product 35 is supported in each product display area 30, and the consumer has identified a desired product 35*d* on the access device 70. In the state of the access device 70 illustrated in FIG. 2, the one or more signals indicative of the selected light characteristic (e.g., flashing blue colored light) and the desired product 35*d* have been communicated to the controller 60. For example, the one or more signals can be transmitted between the access device 70 and the control system 55 upon selection of the locate button 125 or autonomously, as described above. In some examples, the signals can be transmitted via a complementary or accessory device such as a key fob that can be communicatively connected to the access device 70.

In response to the one or more signals, the controller 60 is programmed to control at least one of the light sources 50 associated with the desired product 35*d* to illuminate at least partially based on the light characteristic to identify the location of the desired product 35*d* to the consumer. In this example, the desired product 35*d* is located in the merchandiser 20 on the left (as viewed in FIG. 2), and the light source illuminating the desired product 35*d* (e.g., from above) has changed from a first light characteristic to a second, different light characteristic (i.e. the selected light characteristic—illustrated by a black bar over the desired product 35*d*) to draw the consumer's attention to the location of the desired product 35*d*. Absent the one or more signals, the light source illuminates the product 35 based on a light characteristic (e.g., constant white light) that is different from the selected light characteristic.

Figure 3:
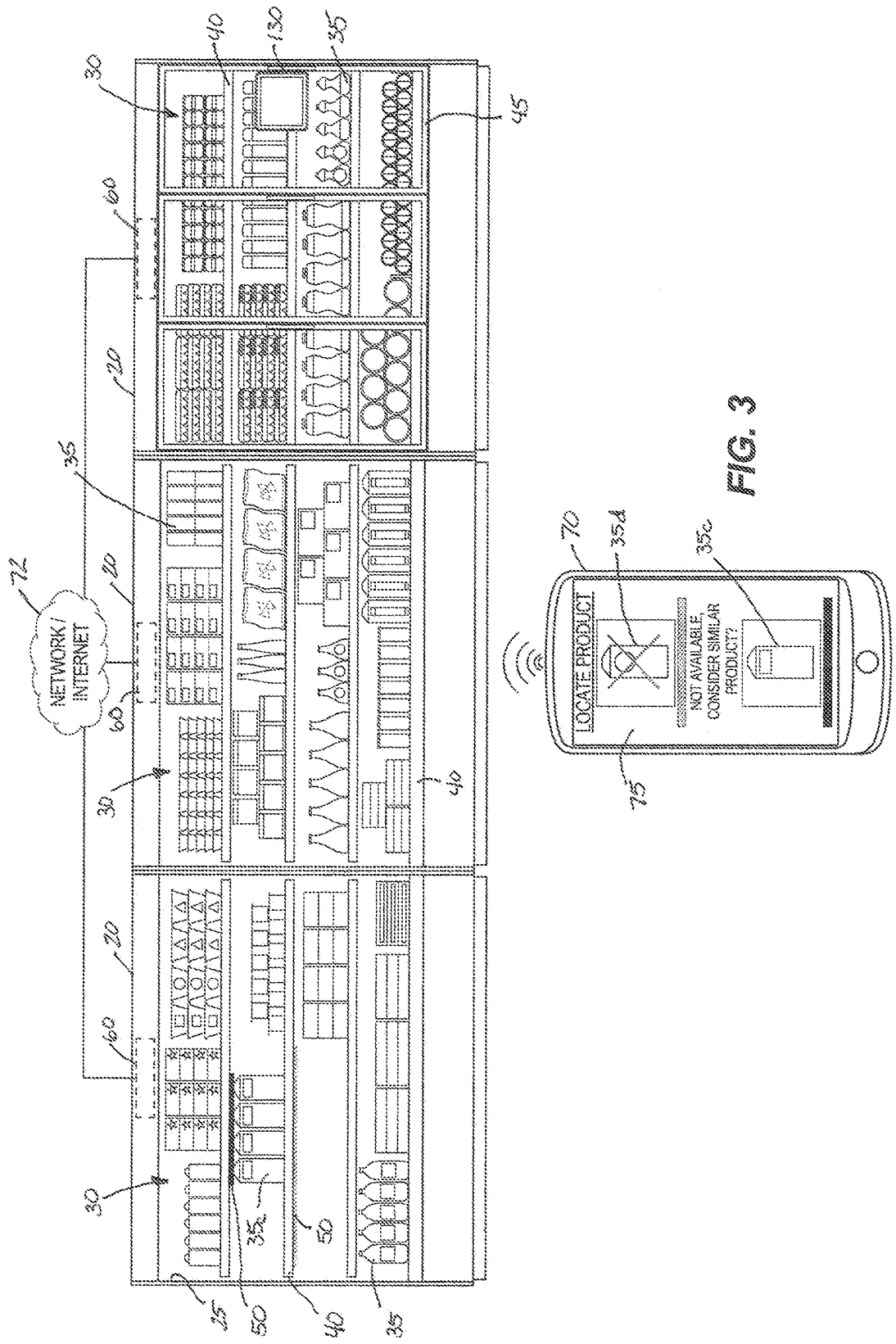
FIG. 3 is another view illustrating several merchandisers connected to the exemplary access device over a network and identifying a replacement product.

FIG. 3 illustrates another example of interaction between the retail environment 15 and the access device 70 with a lineup of merchandisers 20 that is the same as the lineup illustrated in FIG. 2. In this example, the access device 70 is in communication with the control system 55 over the network 72. In the state of the access device 70 illustrated in FIG. 3, the one or more signals indicative of the selected light characteristic (e.g., flashing blue colored light) and the desired product 35*d* have been communicated to the controller 60. In response to the one or more signals, the control system 55 has determined that the desired product 35*d* is unavailable based on an analysis of product inventory. However, the control system 55 recognizes that a related or similar product 35 (referred to as a "complementary" product for purposes of the description of the invention and the claims) is available. Complementary product 35*c* can include, without limitation, product that is similar in characteristics to the desired product, product that is on sale in the vicinity of the desired product (e.g., in the same merchandiser 20, in the same aisle, in the same section of the retail environment 15, etc.), or product 35 that is otherwise related to the desired product 35*d* (e.g., a complementary product may be lobster when the desired product is butter, or pickles, when the complementary product is hamburger buns). Also, complementary product 35*c* can include other product based on a consumer's consumption profile, or nearby product recognized in response to the consumer's search request or based on previous buying behavior.

With continued reference to FIG. 3, the control system 55 communicates the availability of the complementary product 35*c* and is programmed to control at least one of the light sources 50 associated with the complementary product 35*c* to illuminate at least partially based on the selected light characteristic to identify the location of the complementary product 35*c* to the consumer. In this example, the complementary product 35*c* is located in the merchandiser 20 on the left (as viewed in FIG. 2) adjacent the space where the desired product 35*d* is normally supported, and the light source illuminating the complementary product 35*c* (e.g., from above) has changed from the first light characteristic to a second, different light characteristic (i.e. the selected light characteristic—illustrated by a black bar over the complementary product 35*c*) to draw the consumer's attention to the location of the complementary product 35*c*. Absent the one or more signals, the light source illuminates the complementary product 35*c* based on a light characteristic (e.g., constant white light) that is different from the selected light characteristic.

Figure 4:
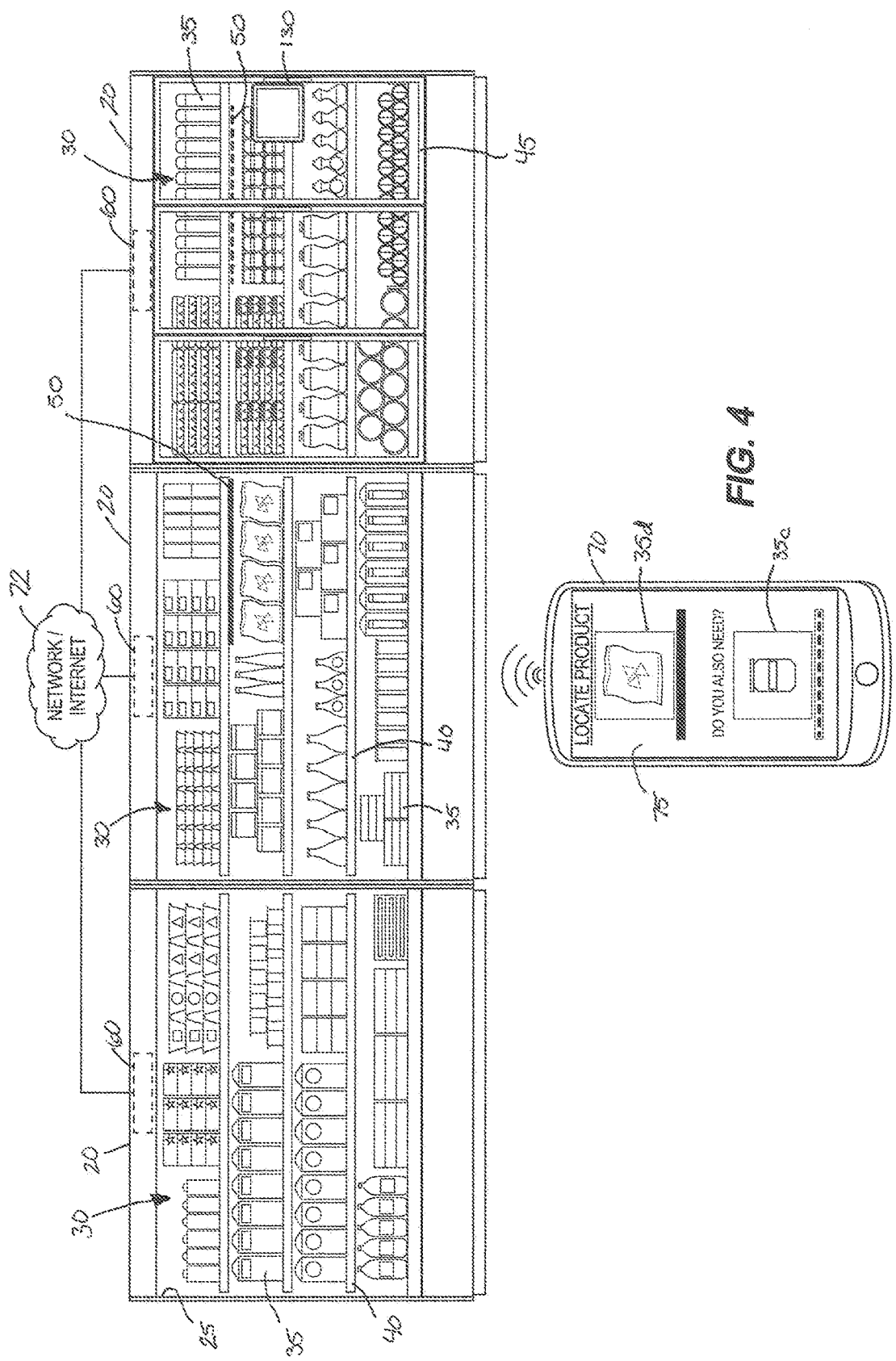
FIG. 4 is another view similar to FIG. 3 and illustrating several merchandisers connected to the exemplary access device over the network and identifying complementary product.

In some examples, the retail system 10 can notify the consumer of complementary product 35*c* using the selected light characteristic or another light characteristic that draws the consumer's attention to the complementary product 35*c*. FIG. 4 illustrates one such example in which the retail system 10 identifies the location of a complementary product 35*c* in addition to the desired product 35*d*. Like the retail system 10 illustrated in and described relative to FIG. 3, FIG. 4 shows that the access device 70 is in communication with the control system 55 over the network 72. In the state of the access device 70 illustrated in FIG. 4, the one or more signals indicative of the selected light characteristic (e.g., flashing blue colored light) and the desired product 35*d* have been communicated to the controller 60. In response to the one or more signals, the control system 55 is programmed to control at least one of the light sources 50 associated with the desired product 35*d* to illuminate at least partially based on the selected light characteristic to identify the location of the desired product 35*d* to the consumer. Like the example described with regard to FIG. 2, the desired product 35*d* is located in the merchandiser 20 on the left (as viewed in FIG. 4), and the light source illuminating the desired product 35*d* (e.g., from above) has changed from a first light characteristic to a second, different light characteristic (i.e. the selected light characteristic—illustrated by a black bar over the desired product 35*d*) to draw the consumer's attention to the location of the desired product 35*d*. Absent the one or more signals, the light source illuminates the product 35 based on a light characteristic (e.g., constant white light) that is different from the selected light characteristic.

In addition to at least partially highlighting the desired product 35*d* based on the selected light characteristic, the control system 55 recognizes that a complementary product 35*c* is available in an adjacent merchandiser 20. More specifically, the control system 55 communicates the availability of the complementary product 35*c* and is programmed to control at least one of the light sources 50 associated with the complementary product 35*c* to illuminate at least partially based on the selected light characteristic or another user-identifiable light characteristic to draw the consumer's attention to the location of the complementary product 35*c*. In this example, the complementary product 35*c* is located in the merchandiser 20 on the right (as viewed in FIG. 4), and the light source illuminating the complementary product 35*c* (e.g., from above) has changed from the first light characteristic to a third light characteristic (e.g., a purple colored light—illustrated by a segmented black bar over the complementary product 35c) to draw the consumer's attention to the location of the complementary product 35c. Absent the one or more signals, the light source illuminates the complementary product 35c based on a light characteristic (e.g., constant white light) that is different from the third light characteristic.

As illustrated in FIGS. 2-4, the access device 70 can be programmed to illustrate, by graphical representations or text or both, the status of the locating functionality provided by the retail system 10. For example, FIG. 4 shows that the user interface 75 illustrates the desired product 35d and the selected light characteristic so the consumer knows what to look for to find the desired product 35d, as well as the complementary product 35c and how the complementary product 35c has been illuminated. Other variations and interaction between the retail environment 15 and the access device 70 are also possible and considered herein.

Figure 5:
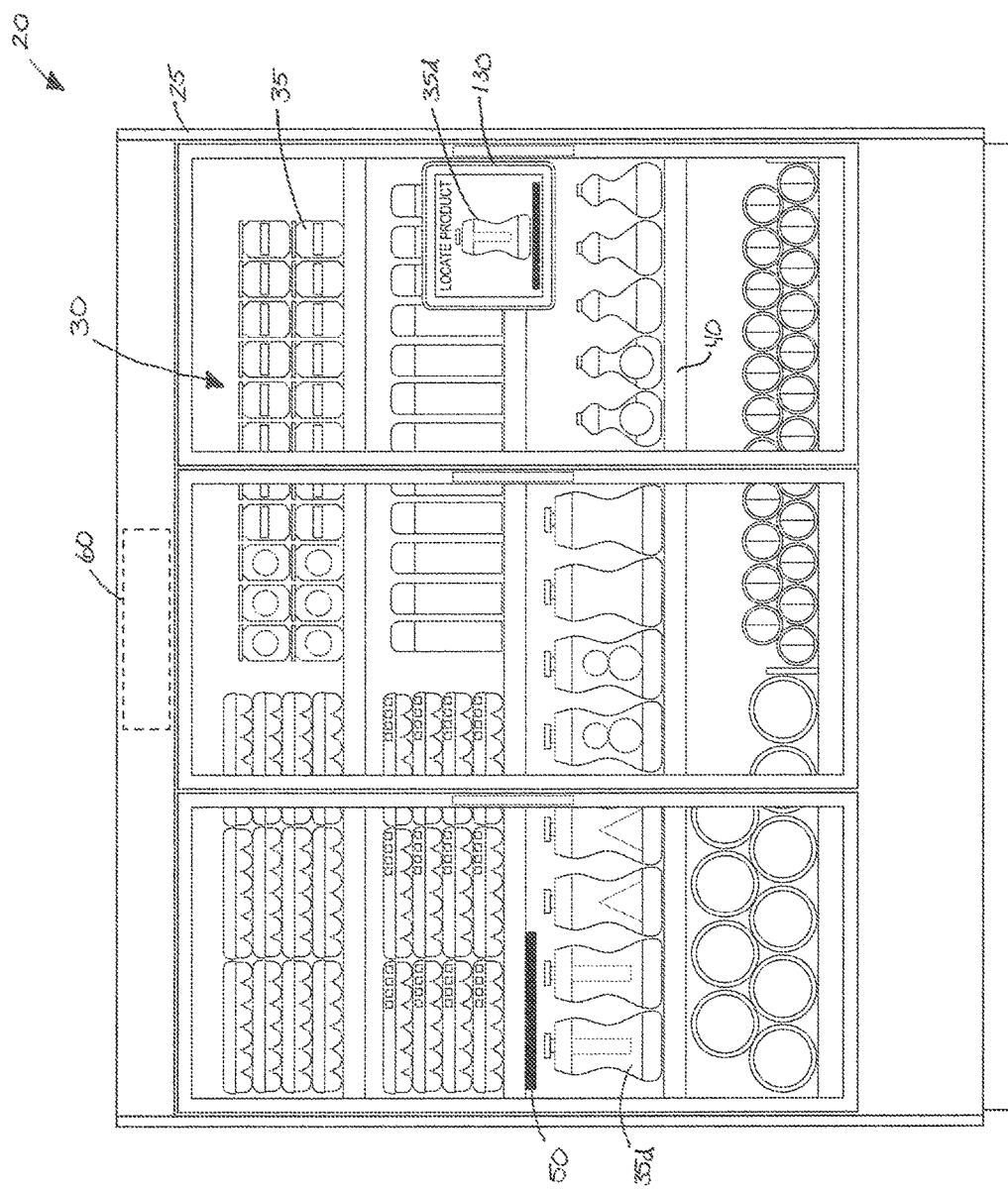
FIG. 5 is a front view of one merchandiser including another exemplary access device for locating product in the merchandiser.

FIGS. 2-5 illustrate yet another example of consumer interaction with the retail environment 15. More specifically, the retail system 10 can include a secondary user interface 130 (e.g., in the form of a computer screen or tablet) that is mounted onto the door 45 of the merchandiser 20. With reference to FIG. 5, a user can search for product 35 and identify the desired product 35d via illumination based on the selected light characteristic. The search can be conducted using text, images of product 35d, or both. Also, the selected light characteristic can be set based on user preferences (e.g., having the user log-in to the retail system 10 to do so), or preset by the retailer or the manufacturer with normalized light characteristics (i.e. light characteristics that are not personal to the consumer). The control system 55 alters the light source illuminating the desired product 35d in the same way as described with regard to FIG. 2.

Figure 13:
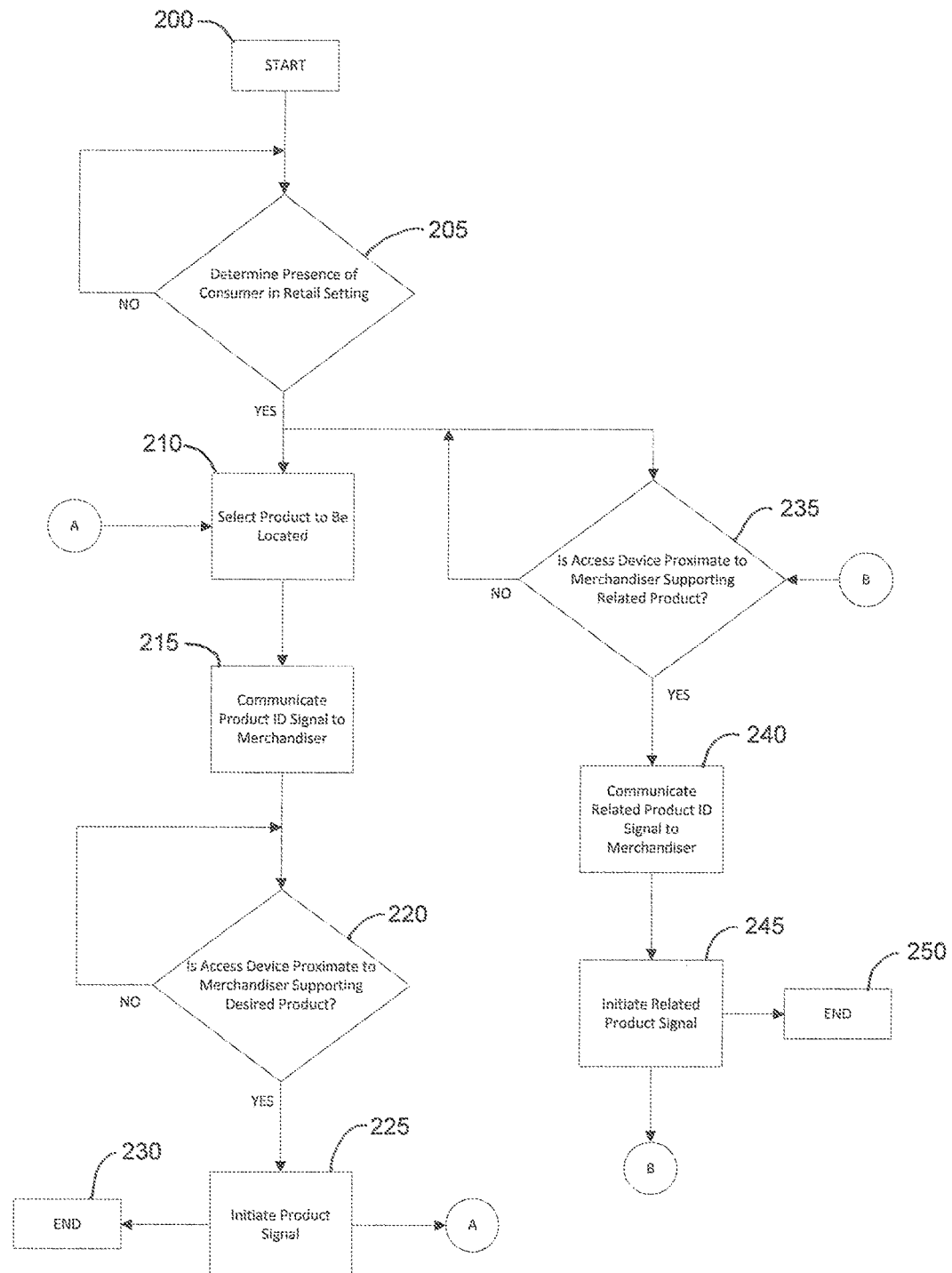
FIG. 13 is a flow chart illustrating an exemplary process for identifying the location of desired product.
Figure 14:
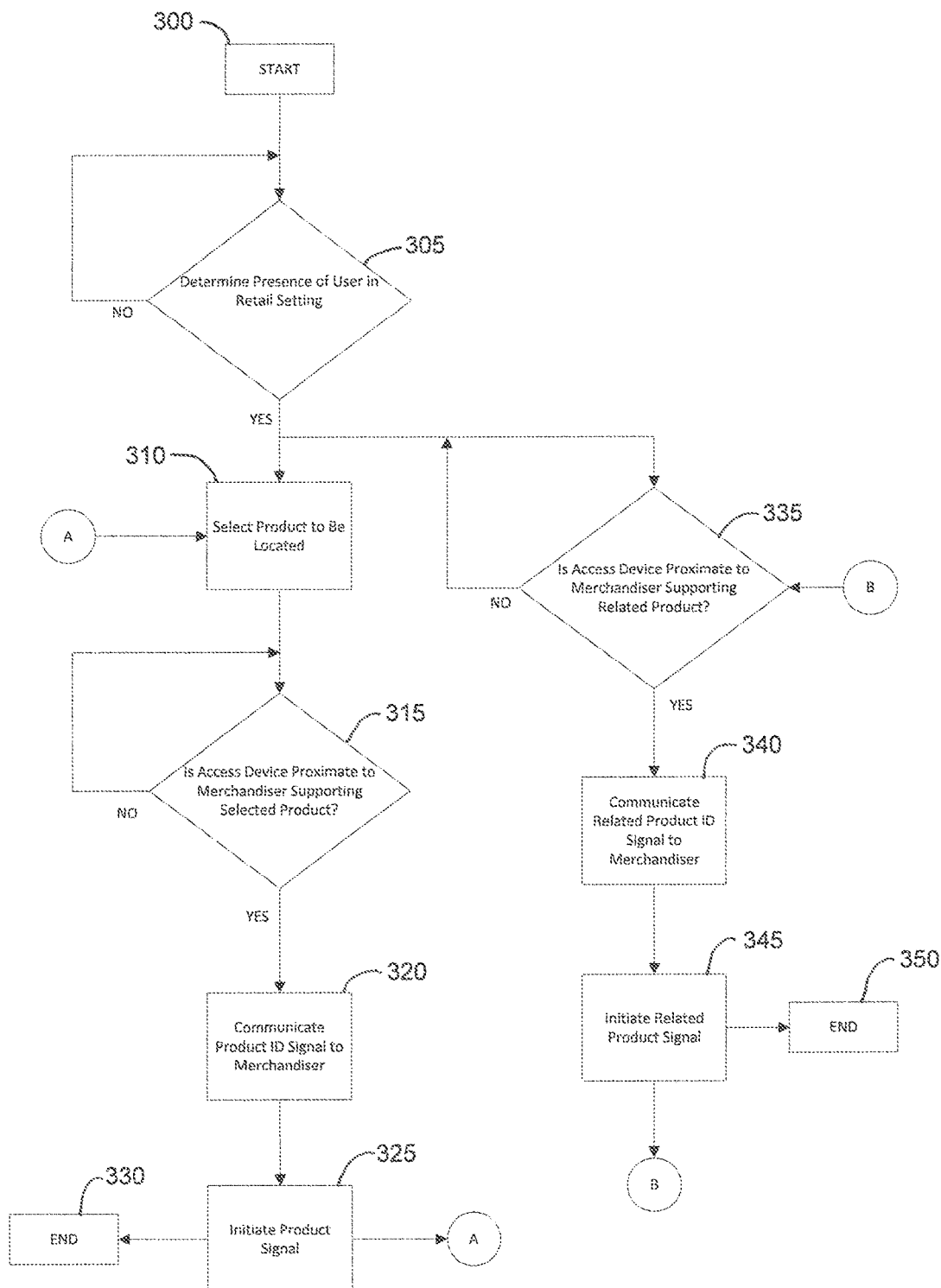
FIG. 14 is a flow chart illustrating another exemplary process for identifying the location of desired product.

FIGS. 13 and 14 illustrate exemplary processes implementing the retail system 10 described with regard to FIGS. 1-12 for interaction between a user and product 35 supported in the retail environment 15. With reference to FIG. 13, the exemplary process starts at step 200, where the user has established a selected light characteristic in advance of locating a product 35 in the retail environment 15. After the personalized light characteristic has been selected, the process moves to step 205 where the retail system 10 determines whether the user is present in the retail environment 15. If the user is not present in the retail environment 15 (i.e. "No" at step 205), the process repeats until the user's presence has been determined. If the user is present in the retail environment 15 (i.e. "Yes" at step 205), the process bifurcates depending on whether the retail system 10 is setup to identify related or complementary product 35c.

To locate the desired product 35d, the process moves to step 210 and the user selects the product 35 to be located by searching for the product 35 (e.g., using the second graphical representation 110), or using a shopping list (e.g., via the locate button 125 on the third graphical representation 120). In some examples, the system can automatically or automatically identify the desired product 35d after the user is present in the retail environment 15 based on the user's shopping list. At step 215, the signal(s) indicative of the desired product 35d and the selected light characteristic are transmitted to the control system 55, which transmits the signals to the merchandiser 20 supporting the desired product 35d. The process then moves to step 220 where the retail system 10 determines whether the access device 70 is within the predetermined range of the merchandiser 20 supporting the desired product 35d. If the user is not within the predetermined range (i.e. "No" at step 220), the process repeats until the user is within the predetermined range. In some examples, the process may return to step 210 to re-initiate the desired product signal (as well as the signal indicative of the selected light characteristic in some cases). If the user is within the predetermined range of the merchandiser 20 (i.e. "Yes" at step 220), the process moves to step 225 where the control system 55 changes the light source(s) associated with the desired product 35d from the first light characteristic to the selected light characteristic.

At this point, the process returns to step 210 if the user desires to locate another product 35 in the retail environment 15. In examples where the product 35 to be located is in a shopping list, the system can sequentially and automatically identify or locate each desired product 35d based on the shopping list (e.g., in order, or based on the most efficient route within the retail environment 15 based on the products on the list). Otherwise, the process moves to step 230 and ends. In the event the user later desires to locate a product 35, the process starts over at step 200.

With continued reference to FIG. 13, when the retail system 10 also identifies complementary product 35c that may be desirable by the user, the process moves from step 205 to step 235 to determine whether the access device 70 is within the predetermined range of the merchandiser 20 supporting the desired product 35d, in parallel with the steps for identifying the location of the desired product 35d described above. If the user is not within the predetermined range (i.e. "No" at step 235), the process repeats until the user is within the predetermined range. In some examples, the process may return to step 205. If the user is within the predetermined range of the merchandiser 20 (i.e. "Yes" at step 235), the process moves to step 240 and the system communicates a complementary product 35c signal to the merchandiser 20 supporting the complementary product 35c. At step 245, the signal(s) indicative of the complementary product 35c and the selected light characteristic (or the user-identifiable light characteristic) are automatically transmitted by the control system 55 to the associated light source to vary the light source to the user-identifiable light characteristic.

At this point, the process returns to step 235 if the system is programmed to locate another complementary product 35c in the retail environment 15. Otherwise, the process moves to step 250 and ends.

FIG. 14 illustrates another exemplary process that involves many of the same steps described with regard to FIG. 13. More specifically, the process starts at step 300, where the user has established a selected light characteristic in advance of locating a product 35 in the retail environment 15. After the personalized light characteristic has been selected, the process moves to step 305 where the retail system 10 determines whether the user is present in the retail environment 15. If the user is not present in the retail environment 15 (i.e. "No" at step 305), the process repeats until the user's presence has been determined. If the user is present in the retail environment 15 (i.e. "Yes" at step 305), the process bifurcates depending on whether the retail system 10 is setup to identify related or complementary product 35c.

To locate the desired product 35d, the process moves to step 310 and the user selects the product 35d to be located by searching for the product 35d (e.g., using the second graphical representation 110), or using a shopping list (e.g., via the locate button 125 on the third graphical representation 120). In some examples, the system can automatically or automatically identify the desired product 35d after the user is present in the retail environment 15 based on the user's shopping list. At step 315, the retail system 10 determines whether the access device 70 is within the predetermined range of the merchandiser 20 supporting the desired product 35d. If the user is not within the predetermined range (i.e. "No" at step 315), the process repeats until the user is within the predetermined range. In some examples, the process may return to step 310 to re-initiate the desired product signal (as well as the signal indicative of the selected light characteristic in some cases). If the user is within the predetermined range of the merchandiser 20 (i.e. "Yes" at step 315), the process moves to step 320. At step 320, the signal(s) indicative of the desired product and the selected light characteristic are transmitted to the control system 55, which transmits the signals to the merchandiser 20 supporting the desired product 35d and initiates the selected light characteristic at step 325.

At this point, the process returns to step 310 if the user desires to locate another product 35 in the retail environment 15. In examples where the product 35 to be located is in a shopping list, the system can sequentially and automatically identify or locate each desired product 35d based on the shopping list (e.g., in order, or based on the most efficient route within the retail environment 15 based on the products on the list). Otherwise, the process moves to step 330 and ends. In the event the user later desires to locate a product 35, the process starts over at step 300.

With continued reference to FIG. 14, the retail system 10 can also identify complementary product 35c to the user when programmed or setup to do so. Steps 335-350 of the process illustrated in FIG. 14 for identifying and locating complementary product 35c is the same as steps 235-250 that have been described with regard to FIG. 13.

The retail system 10 can identify whether the user is in the store based on a wireless signal and can identify or locate the items on a list one at a time. The layout of the retail environment 15 or product location, or both, can be provided on the access device 70 depending on the capabilities built into the system.

With reference to FIGS. 1, 6, 8, and 9, the retail system 10 can leverage product information stored in the database 65 to generate a virtual representation of at least a portion of the retail environment 15 on one or more access devices 70. The retail system 10 also can use the product information to manage inventory and to generate shopping lists. As will be appreciated, the database 65 can store many different pieces of information regarding the product 35 supported in the product display areas 30. The information can include, without limitation, dimensions (length, width, height, depth), weight, three-dimensional design information, dominant colors on packaging or of the foodstuff or non-foodstuff in the package, graphical representations of the product 35, standard lighting colors based on coloring of product or product packaging, preferred lighting effects (colors, motion, etc.), product facing quantity per unit, and other information. The graphical representations of the products 35 can include pictures, images, or other life-like visual representations of the product 35. That is, the graphical representation of the product 35 can include a depiction of the product 35 that is accurate in at least one or any combination of color, shape, and scaled size.

Product information that is stored in the database 65 can be retrieved by the access devices 70 to generate a virtual representation of the product display area 30 (e.g., a planogram) based on the product information stored in the database 65, including the graphical representations of the product 35. The graphical representations of the product 35 stored in the database 65 can include preloaded informational pictures that are provided by the product manufacturer, a vendor, or personnel directly affiliated with the retail environment 15. The virtual representation can depict product using the product information stored in the database 65 to define an appearance of the product display area 30 so that a user (e.g., store manager, owner, designer, etc.) can visually determine the layout of each merchandiser 20 with product 35 virtually supported in the product display area 30. This determination can assist with planning a store or merchandiser 20 layout prior to product 35 being placed in the product display area 30 for the first time, altering a store layout (i.e. defining the appearance of the product display area 30 after product 35 already has been placed in the product display area 30), or determining the current visual characteristics of existing merchandisers 20. An exemplary system that uses planograms and virtual layouts for product display locations to control lighting is described in commonly assigned U.S. patent application Ser. No. 13/874,781.

The product information stored in the database 65 also can facilitate shopping list generation and inventory management. In this context, the retail system 10 can include one or more cameras or image capturing devices 135 that are coupled to the merchandisers 20 and that can take visual snapshots of the product display areas 30 to assist with shopping list generation and inventory management. The snapshots can include continuous movies or images (a video image), or still images that are taken at predetermined time intervals. The snapshot can include a picture or any other image that accurately depicts product 35 in the product display area 30 in any combination of color, shape, and scaled size. That is, the visual snapshot is indicative of product 35 actually supported in the product display area 30.

The microprocessor 80 of the access device 70 is programmed to access the visual snapshot via the database 65 and to manage or determine inventory of the associated product display area 30 based on a comparison with a graphical representation of the product 35. The graphical representation of the product 35 can be accessed from the database 65, or by taking a picture of the product 35 with the access device 70 (or another device).

As illustrated in FIG. 1, the access devices 70 include analysis tools 140a and the database 65 includes an analysis tool 140b that, together or separately, facilitate creation of shopping lists and management of inventory. It will be appreciated that the analysis tool 140 can be provided in the database 65 or in the access devices 70, or separate analysis tools 140 can be provided in both the database 65 and the access devices 70. Each analysis tool 140 can evaluate the graphical representation of the product 35 relative to the snapshots stored in the database 65 to determine a match between the graphically represented product 35 and the product display area 30 that supports the product graphically represented so that a user (e.g., a consumer or personnel of the retail environment 15) can evaluate whether an item is in stock or needs restocking. The user interface 75 of the access devices 70, or the secondary user interface 130 illustrated in FIGS. 2-5, can be used to facilitate the comparison.

Referring back to FIGS. 8 and 9, the access device 70 can display a product list using text, pictures, or some combination of both, as well as the location of product 35 in the retail environment 15. The shopping list can be generated by taking a picture of the desired product 35d (FIG. 8). In some examples, the microprocessor 80 or one or more of the analysis tools 140, or both, identify the product 35 from the picture by comparing the picture to the visual product information (e.g., pre-loaded informational pictures) stored in the database 65. With the product identified, the user can confirm that the identified product is the desired product 35d and then add the product 35d to the shopping list (FIG. 9). By comparing the generated picture with the graphical representations of product stored in the database 65, the user can confirm whether the retail environment 15 sells the desired product or a similar product.

By comparing the generated picture with the graphical representations of product 35 stored in the database 65, the user also can determine inventory while generating the shopping list, or separate from shopping list generation. For example, the access device 70 can determine real-time or near real-time inventory of the desired product 35d by identifying the product 35 from which the product picture was taken (using the product information in the database 65), and comparing the product picture to one or more of the snapshots accessible via the database 65. In some constructions, the snapshot can be a continuous video image that can be accessed directly from the merchandiser 20 without having to access the database 65.

The database 65 can contain video images, still images, or a combination of video and still images so that a picture of product 35 can be compared to what is stored in the database 65 to determine whether the desired product 35d is available in the retail environment 15, and to assist with generating a shopping list. With the image capturing devices 135, a consumer can select product 35 based on inventory availability by referring to the picture and knowing whether the product 35 is in stock. The retail system 10 can be used for product purchasing or inventory management remotely (via the network 72 and/or the access devices 70), or locally (e.g., by placing the visual snapshot of the product display area 30 on the secondary user interface 130 disposed on the door 45 of the merchandiser). The visual snapshot can be communicated from the image capturing devices 135 to the database 65 (and other destinations) via any suitable communication system (e.g., Wi-Fi Bluetooth, cellular network, Internet, etc.).

Various features and advantages of the invention are set forth in the following claims.

The invention claimed is:

1. A retail system configured to provide interaction between a user and product supported in a retail environment, the retail system comprising:
   a plurality of merchandisers each defining a product display area in which product is supported, each merchandiser including one or more light sources positioned to illuminate the product;
   an access device including a processing system operable to select a light characteristic associated with the light sources in response to user input, the access device having a user interface for selection of a desired product, and the access device programmed to generate one or more signals indicative of the selected light characteristic and the desired product; and
   a controller in communication with the light sources and the access device,
   wherein, in response to the one or more signals indicative of the selected light characteristic and the desired product, the controller is programmed to control at least one of the light sources associated with the desired product to illuminate at least partially based on the light characteristic to identify a location of the desired product to a user.

2. The system of claim 1, wherein the light sources are positioned to illuminate the product based on a different light characteristic absent the one or more signals.

3. The system of claim 1, wherein the light characteristic is defined by and personal to the user based on predetermined parameters of the light sources.

4. The system of claim 3, wherein the access device is in communication with a database including the predetermined parameters.

5. The system of claim 1, wherein the access device is programmed to transmit the one or more signals indicative of the selected light characteristic and the desired product to the controller in response to manual activation of the signals and in response to the access device being positioned within a predetermined range of the merchandiser supporting the desired product.

6. The system of claim 1, wherein the access device is programmed to autonomously transmit the one or more signals indicative of the selected light characteristic and the desired product to the controller in response to the access device being positioned within a predetermined range of the merchandiser supporting the desired product.

7. The system of claim 1, wherein the light characteristic includes one or any combination of a) a color, b) a pulse, c) a repeated rhythm, or d) indicia configured to identify the desired product in the merchandiser.

8. The system of claim 1, wherein the access device is in wireless communication with the controller via one or both of a wide area network connection and a local area network connection specific to the retail environment.

9. The system of claim 1, wherein the controller, in response to the signal indicative of the desired product, is further programmed to control another of the light sources in at least one of the merchandisers to identify a location of a complementary product to the user.

10. The system of claim 9, wherein the other light source is controlled to illuminate based on a user-identifiable light characteristic.

11. The system of claim 10, wherein the user-identifiable light characteristic includes the selected light characteristic or another light characteristic different from a light characteristic used to illuminate the product absent the signals from the access device.

12. The system of claim 1, wherein the light sources are secondary light sources positioned adjacent primary light sources to assist with identifying the location of the desired product.

13. A method of interaction between a user and product supported in a retail environment including one or more merchandisers defining respective product display areas in which product is supported and having one or more light sources positioned to illuminate the product, the method comprising:
   transmitting a signal indicative of a desired product to the merchandiser supporting the desired product via an access device;
   altering a light characteristic of at least one of the light sources associated with the desired product in response to the signal indicative of the desired product; and
   illuminating the desired product with the altered light to identify a location of the desired product.

14. The method of claim 13, further comprising
   illuminating the product using a first light characteristic of the at least one of the light sources absent the signal; and
   illuminating the product based on a second, different light characteristic in response to the signal.

15. The method of claim 13, further comprising
selecting a light characteristic associated with light sources in the merchandisers, the selected light characteristic personal to the user;
transmitting a signal indicative of the selected light characteristic to the merchandiser along with the signal indicative of the desired product; and
modifying light output of the at least one of the light sources from a first light characteristic to the selected light characteristic.

16. The method of claim 15, further comprising
accessing a database to select the desired product; and
linking the selected light characteristic to the desired product in response to selecting the desired product.

17. The method of claim 16, defining the selected light characteristic based on predetermined parameters of the light sources prior to selecting the desired product.

18. The method of claim 13, further comprising
transmitting the signal indicative of the desired product to the merchandiser supporting the desired product in response to manual selection of a graphical representation of the desired product; and
altering the light characteristic of the at least one of the light sources in response to transmission of the signals when the access device is within a predetermined range of the merchandiser.

19. The method of claim 13, further comprising
autonomously transmitting the signal indicative of the desired product to the merchandiser supporting the desired product in response to automatic activation of the signal; and
altering the light characteristic of the at least one of the light sources according in response to transmission of the signals when the access device is within a predetermined range of the merchandiser.

20. The method of claim 19, wherein automatic activation of the signal includes positioning the access device within the predetermined range of the merchandiser.

21. The method of claim 13, wherein altering the light characteristic includes one or any combination of a) changing a color of the light source, b) pulsing the light source, c) repeating a rhythm of light, and d) illuminating indicia configured to identify the desired product in the merchandiser.

22. The method of claim 13, further comprising communicating the signal over a local network within the retail environment.

23. The method of claim 13, further comprising
controlling illumination of another of the light sources in one of the merchandisers in response to the signal indicative of the desired product; and
identifying a location of a complementary product to the user via the other light source.

24. The method of claim 23, wherein controlling illumination of the other light source includes altering a light characteristic of the other light source based on a user-identifiable light characteristic.

25. The method of claim 24, wherein the user-identifiable light characteristic includes a user-selected light characteristic or another light characteristic different from a light characteristic used to illuminate the product absent the signals from the access device.

26. A method of interaction between a user and product supported in a retail environment including one or more merchandisers defining respective product display areas in which product is supported and having one or more light sources positioned to illuminate the product, the method comprising:
selecting a light characteristic associated with light sources in the merchandisers, the selected light characteristic identifiable to a user;
transmitting one or more signals indicative of a selected light characteristic and a desired product to the merchandiser supporting the desired product in response to selection of the desired product via an access device;
modifying light output of at least one of the light sources from a first light characteristic to the selected light characteristic at least partially in response to the one or more signals;
identifying a location of the desired product to the user via illumination based on the selected light characteristic; and
identifying a location of product complementary to the desired product in response to the one or more signals to the merchandiser.

27. The method of claim 26, wherein identifying the location of complementary product includes altering a light characteristic of another of the light sources in one of the merchandisers in response to the signal indicative of the desired product.

28. The method of claim 27, wherein the light characteristic of the other light source includes a user-identifiable light characteristic.

29. The method of claim 28, wherein the light characteristic of the other light source matches the selected light characteristic.

30. The method of claim 26, further comprising
accessing a database to select the desired product; and
linking the selected light characteristic to the desired product in response to selecting the desired product.

31. The method of claim 26, further comprising illuminating the desired product based on the first light characteristic absent the one or more signals.

32. The method of claim 26, further comprising defining the selected light characteristic based on predetermined parameters of the light sources after to selecting the desired product.

33. The method of claim 26, further comprising
transmitting the one or more signals indicative of the selected light characteristic and the desired product to the merchandiser supporting the desired product in response to manual activation of the one or more signals; and
controlling the at least one of the light sources according the selected light characteristic in response to transmission of the signals when the access device is within a predetermined range of the merchandiser.

34. The method of claim 26, further comprising
autonomously transmitting the one or more signals indicative of the selected light characteristic and the desired product to the merchandiser supporting the desired product in response to automatic activation of the one or more signals; and
controlling the at least one of the light sources according the selected light characteristic in response to transmission of the signals when the access device is within a predetermined range of the merchandiser.

35. The method of claim 34, wherein automatic activation of the signals includes positioning the access device within the predetermined range of the merchandiser.

36. The method of claim 26, wherein the step of modifying light output includes one or any combination of a)

changing a color of the light source, b) pulsing the light source, c) repeating a rhythm of light, and d) illuminating indicia configured to identify the desired product in the merchandiser.

37. The method of claim 26, further comprising communicating the one or more signals over a local network within the retail environment.

\* \* \* \* \*